(12) United States Patent  (10) Patent No.: US 8,086,034 B2
Quan  (45) Date of Patent: Dec. 27, 2011

(54) SYSTEM AND METHOD FOR REDUCING COLOR ARTIFACTS IN DIGITAL IMAGES

(75) Inventor: Shuxue Quan, San Diego, CA (US)

(73) Assignee: Aptina Imaging Corporation, George Town (KY)

( * ) Notice: Subject to any disclaimer, the term of this patent is extended or adjusted under 35 U.S.C. 154(b) by 996 days.

(21) Appl. No.: 12/025,926

(22) Filed: Feb. 5, 2008

(65) Prior Publication Data

US 2009/0196498 A1   Aug. 6, 2009

(51) Int. Cl.
*G06K 9/00* (2006.01)

(52) U.S. Cl. ........ 382/167; 382/162; 382/168; 382/274; 345/589; 358/518

(58) Field of Classification Search .................. 382/162, 382/167, 164, 168, 274; 345/589, 590, 600, 345/605; 348/272, 273, 222.1, 453; 358/518, 358/523

See application file for complete search history.

(56) References Cited

U.S. PATENT DOCUMENTS

| | | | |
|---|---|---|---|
| 3,971,065 A | 7/1976 | Bayer | |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,392,699 B1 * | 5/2002 | Acharya | 348/273 |
| 2002/0101524 A1 * | 8/2002 | Acharya | 348/273 |
| 2004/0080639 A1 * | 4/2004 | Ishiga | 348/272 |
| 2005/0030396 A1 * | 2/2005 | Park et al. | 348/252 |
| 2007/0153106 A1 | 7/2007 | Subbotin | |

* cited by examiner

*Primary Examiner* — Samir Ahmed
*Assistant Examiner* — Ali Bayat (57) ABSTRACT

Systems and methods for reducing color artifacts in digital images. A disclosed embodiment includes averaging original color pixel values of a subject pixel in a first color domain (e.g., red, green, and blue values when operating on demosaiced pixels in the Bayer domain) with respective color pixel values of adjacent pixels, converting the average color pixel values to a second color domain, determining replacement color pixel values in the first color domain based on the color pixel values in the second color domain, and replacing the original color pixel values of the subject pixel with the replacement color pixel values. Embodiments can be repeated for some or all pixels in a digital image to reduce color artifacts across a portion of the image or the entire image, and can be performed during or at any time after demosaicing.

25 Claims, 11 Drawing Sheets

SYSTEM AND METHOD FOR REDUCING COLOR ARTIFACTS IN DIGITAL IMAGES

FIELD OF THE INVENTION

The disclosed embodiments relate generally to processing digital images and, more particularly, to methods and apparatuses for reducing color artifacts in digital images.

BACKGROUND

Solid state imagers typically consist of an array of thousands or even millions of pixel cells organized into rows and columns. Each pixel cell contains a photosensor (e.g., a photodiode) that is configured to produce an electrical signal corresponding to the intensity of light impinging on it when an image of a scene is focused on the array by one or more lenses. Each signal can be converted to a digital pixel value (i.e., a number associated with a pixel cell), usually with small numbers representing lower light intensity (i.e., darker areas of the scene) and larger numbers representing higher light intensity (i.e., brighter areas of the scene). A digital image can be formed by organizing the pixel values into rows and columns corresponding to the arrangement of their respective pixel cells in the pixel array. The digital image can be stored in a memory, displayed on a monitor, manipulated by software, printed, or otherwise used to provide information about the scene.

Several kinds of imagers are generally known. Complementary metal-oxide-semiconductor ("CMOS") imagers and charge coupled device ("CCD") imagers are among the most common. CMOS imagers are discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, all assigned to Micron Technology, Inc.

For an imager to capture a color image, its pixel cells must be able to separately detect values of colored light, for example, red (R) light, green (G) light, and blue (B) light. A color filter array is typically placed in front of the array of pixel cells so each pixel cell measures only light of the color of its respective filter. The most common type of color filter array, often referred to as a "Bayer color filter array," is described in U.S. Pat. No. 3,971,065. Bayer color filter arrays consist of alternating red and green filters in a first row and alternating green and blue filters in a second row. This pattern is repeated throughout the array. Thus, in an imager employing a Bayer color filter array, one-half of the pixel cells are sensitive to green light, one-quarter are sensitive to red light, and the remaining one-quarter are sensitive to blue light.

To provide a color image, however, red, green, and blue values are required for every pixel. Thus, the two "missing" color values at each pixel location must be estimated, usually by reference to other nearby pixel values. This estimation process is often refined to as "demosaicing." Several demosaicing techniques are known in the art. For example, U.S. Pub. No. 2007/0153106 and U.S. patent application Ser. No. 11/873,423 (not yet published), both assigned to Micron Technology, Inc., disclose two demosaicing techniques.

After demosaicing, three or four color values are typically associated with each pixel, depending on the color space used by the imager or processing software. RGB and $YC_bC_r$ are two common color spaces. In the RGB color space, also referred to as the "Bayer domain," a red value (R), a blue value (B), and a green value (G) are associated with each pixel. In the $YC_bC_r$ color space, a luminance (i.e., brightness) value (Y) and two chrominance (i.e., color) values ($C_b$ and $C_r$) are associated with each pixel.

Sometimes color pixel values do not accurately reflect the true color in a corresponding part of a scene. For example, a pixel corresponding to the edge of a white region in a scene might appear colored rather than white. Digital image processing ran be used to correct such errors, which are also referred to as "color artifacts." Aliasing artifacts are one common kind of color artifact. Aliasing occurs when detail in a scene exceeds the sampling frequency of the imager, for example, when the lines of detail in an image exceed the number of rows of pixels in the pixel array of an imager. Aliasing can result in color artifacts along edges of details in an image and especially, though not exclusively, along edges involving an abrupt black-to-white transition. The tendency of lenses to refract different wavelengths of light differently is another common cause of color artifacts. Color artifacts may also appear as isolated colored "dots," sometimes comprising only a single wrongly-colored pixel, in an image. These isolated colored dots can be caused, for example, by a defect in the imager or an error during demosaicing.

Correcting the root causes of color artifacts requires additional hardware components or substitution of higher-quality hardware components, such as, for example, a pixel array with more pixels or lenses that refract varying wavelengths of light more evenly. These solutions are often impractical, particularly in low-cost imagers. Therefore, a less expensive method for correcting color artifacts in digital images, particularly one which does not require additional or higher-quality hardware, is desirable.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely exemplary. The sequence of steps is not limited to that set forth herein and may be changed or reordered, with the exception of steps necessarily occurring in a certain order.

The embodiments described herein provide methods and systems for reducing color artifacts in digital images without the need for additional or higher-quality hardware. More particularly, the disclosed embodiments relate to techniques in which the color of a pixel is adjusted based on the color of adjacent pixels, a process sometimes referred to as "chroma blurring." The embodiments may be implemented in an image processor associated with a pixel array in an image capture device or they may be implemented in a separate image processor that receives captured pixel data.

Throughout the detailed description below, the term "red pixel" is used to refer to a pixel cell associated with a red portion of a Bayer color filter array. In other words, "red pixel" refers to a pixel cell that is configured to directly measure incident red light. Similarly, the terms "green pixel" and "blue pixel" are used to refer to pixel cells associated with green and blue portions of a Bayer color filter array, respectively. After demosaicing, however, several color values may be associated with each pixel cell. The term "pixel value" is used to refer to a color value associated with a pixel cell, regardless of whether the color value was directly measured by the pixel cell or estimated during demosaicing. For example, in a typical imager fitted with a Bayer color filter array, a red pixel value, a green pixel value, and a blue pixel value would be associated with every pixel cell after demosaicing.

In the formulas and detailed description below, the notation $R_{(r,c)}$ is used to refer to the red pixel value associated with the pixel cell at row r and column c of a pixel array. Similarly, the notations $G_{(r,c)}$ and $B_{(r,c)}$ are used to refer to green and blue pixel values, respectively, associated with the pixel cell at row r and column c of a pixel array. These pixel values may be color pixel values measured directly by a pixel cell (e.g. a red pixel value for a pixel cell associated with a red portion of the Bayer color filter array) or demosaiced color pixel values (e.g., a blue pixel value for a pixel cell associated with a red portion of the Bayer color filter array). Sometimes an offset (e.g., −1 or +1) appears in the row and column subscript. This offset refers to a pixel cell at a location relative to the pixel cell at row r and column c of a pixel array. For example, $R_{(r,c-1)}$ refers to the red pixel value of the pixel cell in the same row but adjacent column as the pixel cell at row r and column c of a pixel array Similarly, $R_{(r,c+1)}$ refers to the red pixel value of the pixel cell in the same row but adjacent column in the opposite direction. Relative pixel locations referred to in the formulas below are illustrated in FIGS. 2A through 5B.

Figure 1:
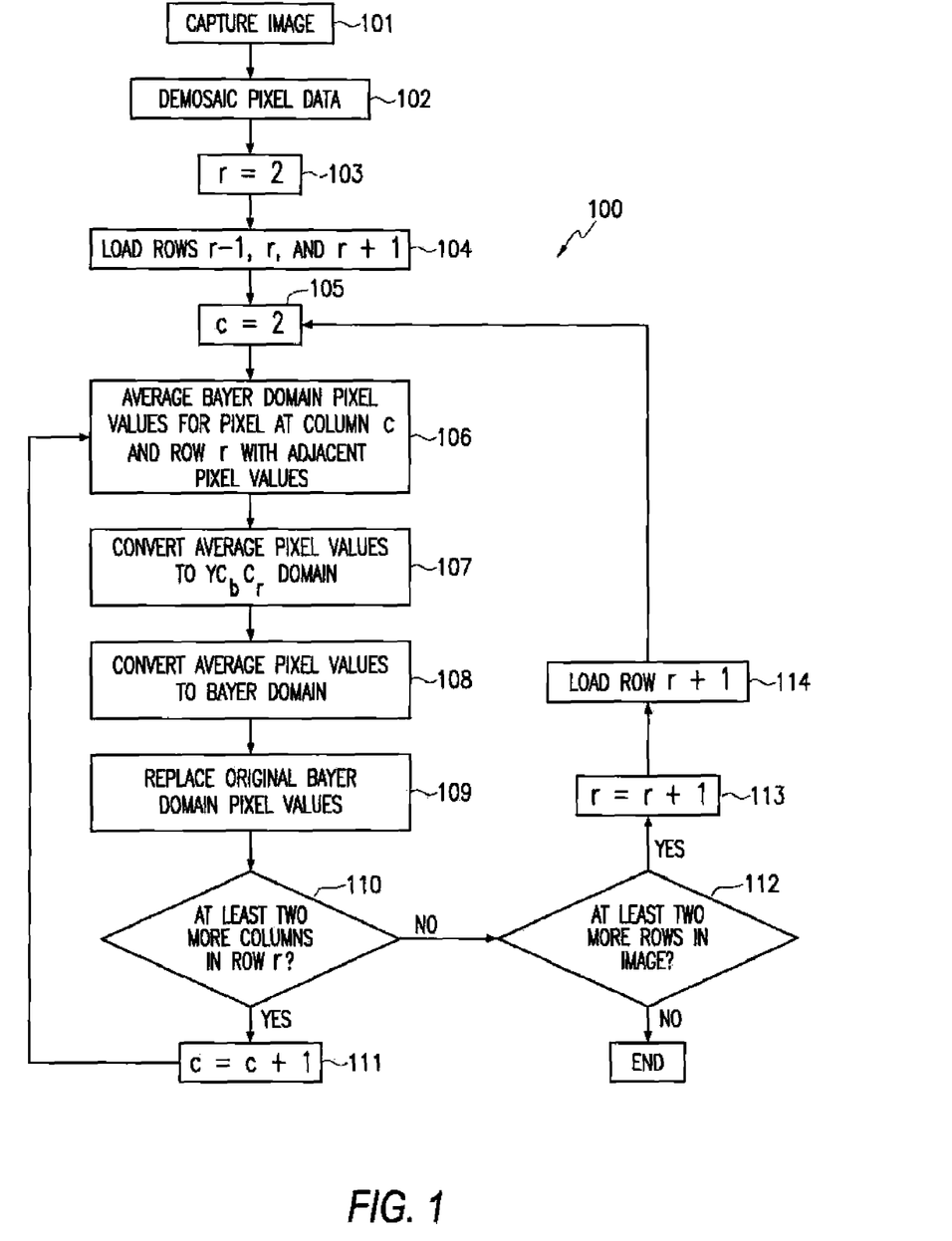
FIG. 1 is a flowchart illustrating a method for reducing color artifacts in digital images in accordance with a disclosed embodiment.

FIG. 1 illustrates a method 100 for reducing color artifacts in digital images in accordance with a disclosed embodiment. At step 101, an imager (e.g., a CMOS imager) captures an image of scene. After step 101, one color pixel value is associated with each pixel cell. For example, only a red pixel value would be associated with a red pixel. At step 102, demosaicing is performed to estimate other color values associated with each pixel cell. After step 102, a plurality of color pixel values may be associated with each pixel cell. For example, in the Bayer domain, a red pixel value, a green pixel value, and a blue pixel value would be associated with each pixel cell.

At step 103, a current row counter, r, is initialized to 2, referring to the second row of pixel values. The disclosed embodiments begin processing at the second row because, as described below, processing a row r requires referencing pixel values in row r−1 (i.e., the previous row of pixel values). At step 104, rows r−1, r, and r+1 are loaded into a memory (e.g., a three line buffer memory), if they are not already loaded. At step 105, a current column counter, c, is initialized to 2, referring to the pixel in the second column of a row. The disclosed embodiments begin processing at the second column because, as described below, processing the pixel at column c requires referencing pixel values of the pixel at column c−1 (i.e., the previous pixel in a row).

At step 106, pixel values, which may include both directly measured color pixel values and demosaiced color pixel values as described above, associated with the pixel at column c and row r (referred to herein as the "subject pixel") are averaged with pixel values associated with adjacent pixels according to the formulas below. In a disclosed embodiment operating in the Bayer domain, red pixel values of the subject pixel are averaged with red pixel values of adjacent pixels, green pixel values of the subject pixel are averaged with green pixel values of adjacent pixels, and blue pixel values of the subject pixel are averaged with blue pixel values of adjacent pixels.

Four average pixel values—$\bar{R}$, $\bar{G}_r$, $\bar{B}$, and $\bar{G}_b$—are computed during step 106. These are intermediate values used in subsequent computations, as described below. $\bar{R}$ is the average of red pixel values of the subject pixel and adjacent pixels. $\bar{G}_r$ is the average of green pixel values of the subject pixel and adjacent green pixels in red/green rows. $\bar{B}$ is the average of blue pixel values of the subject pixel and adjacent pixels. $\bar{G}_b$ is the average of green pixel values of the subject pixel and adjacent green pixels in green/blue rows.

As described above, which adjacent pixel values are averaged depends on the color of the Bayer color filter array portion associated with the subject pixel (i.e., the color of light directly measured by the pixel cell). FIGS. 2A through 5B each depict a portion of a pixel array 200. The letters—R, G, and B—in each pixel cell refers to the color of the Bayer color filter array portion associated with the pixel cell. The subject pixel cell is shaded with diagonal lines in two directions. Adjacent pixel cells whose pixel values are referenced during processing of the subject pixel are shaded with diagonal lines in one direction.

Figure 2A:
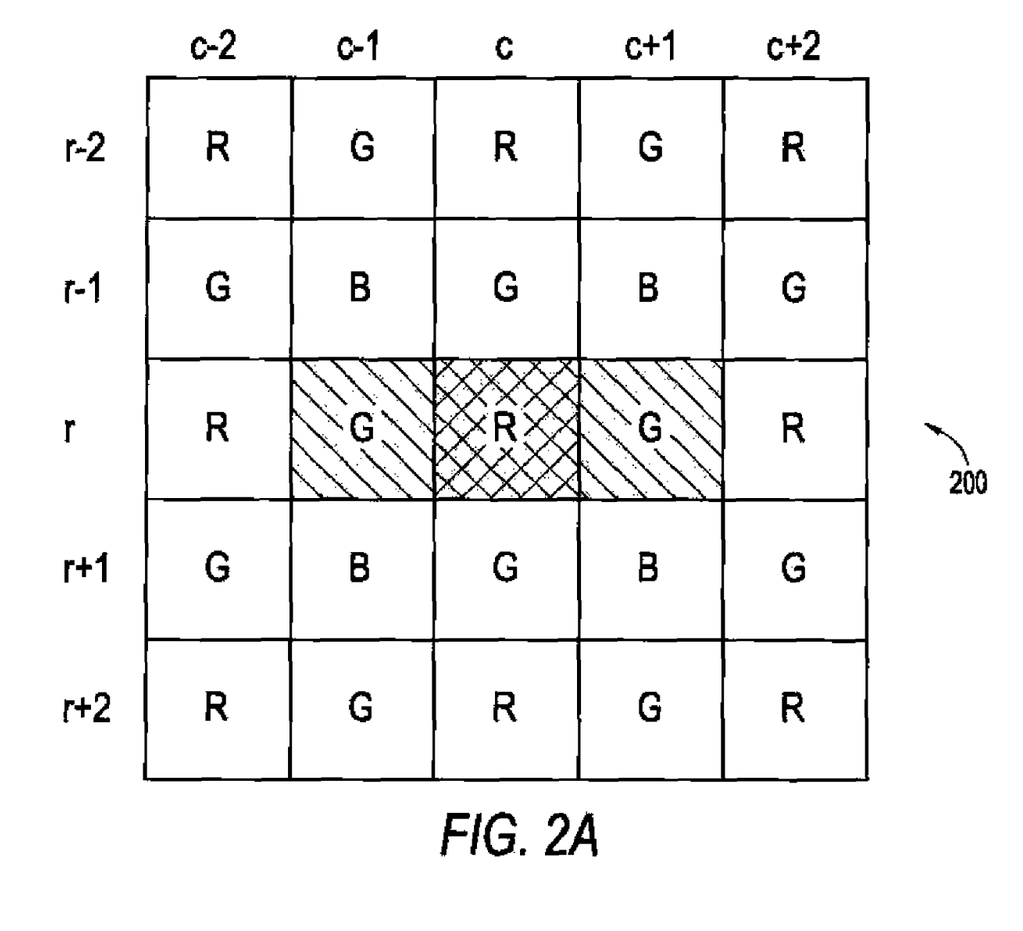
FIG. 2A illustrates a portion of a pixel array and the relative locations of pixels referenced in formulas (1) and (2).
Figure 2B:
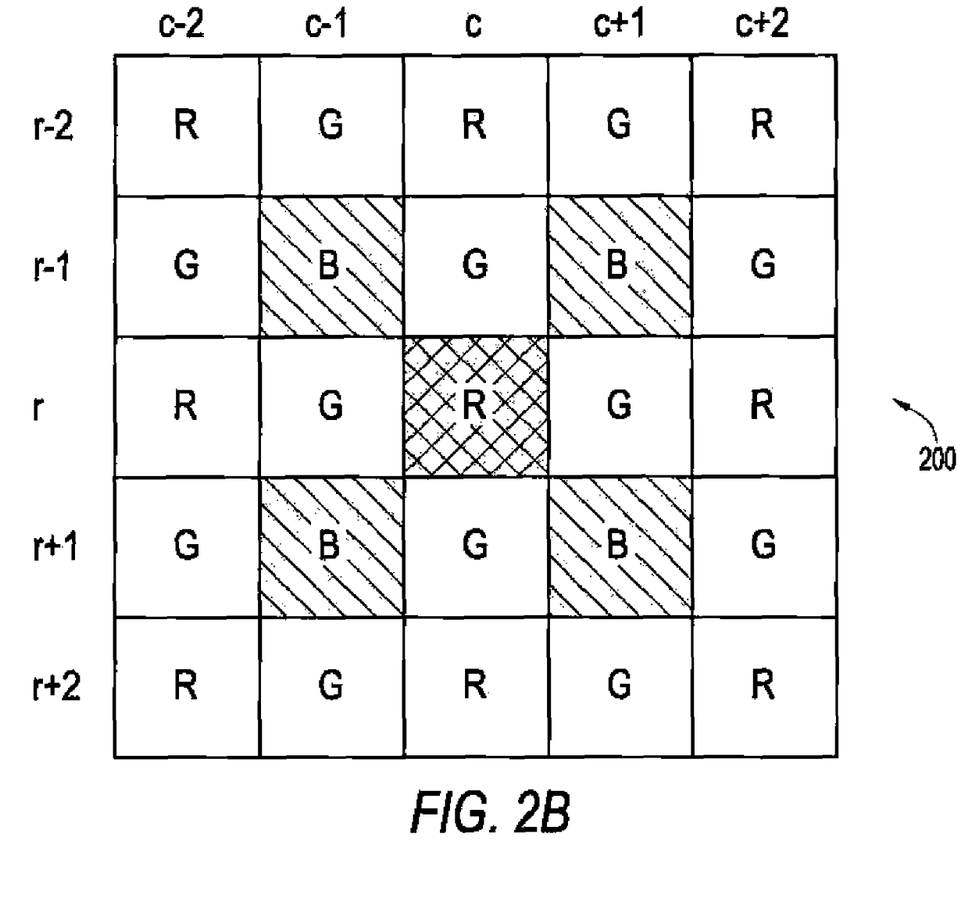
FIG. 2B illustrates a portion of a pixel array and the relative locations of pixels referenced in formulas (3) and (4).

When the subject pixel is a red pixel (e.g., the pixel at row r and column c in FIG. 2A), $\bar{R}$, $\bar{G}_r$, $\bar{B}$, and $\bar{G}_b$ can be computed as follows.

$$\bar{R}_{(r,c)} = \frac{R_{(r,c-1)} + R_{(r,c)} + R_{r,c+1}}{3} \quad (1)$$

$$\bar{G}_{r_{(r,c)}} = \frac{G_{(r,c-1)} + G_{(r,c)} + G_{(r,c+1)}}{3} \quad (2)$$

$$\bar{B}_{(r,c)} = \frac{B_{(r,c)} + B_{(r-1,c-1)} + B_{(r-1,c+1)} + B_{(r+1,c-1)} + B_{(r+1,c+1)}}{5} \quad (3)$$

$$\bar{G}_{(r,c)} = \frac{G_{(r,c)} + G_{(r-1,c-1)} + G_{(r-1,c+1)} + G_{(r+1,c-1)} + G_{(r+1,c+1)}}{5} \quad (4)$$

FIG. 2A illustrates the relative locations of the pixels referenced in formulas (1) and (2). Similarly, FIG. 2B illustrates the relative locations of the pixels referenced in formulas (3) and (4).

Figure 3A:
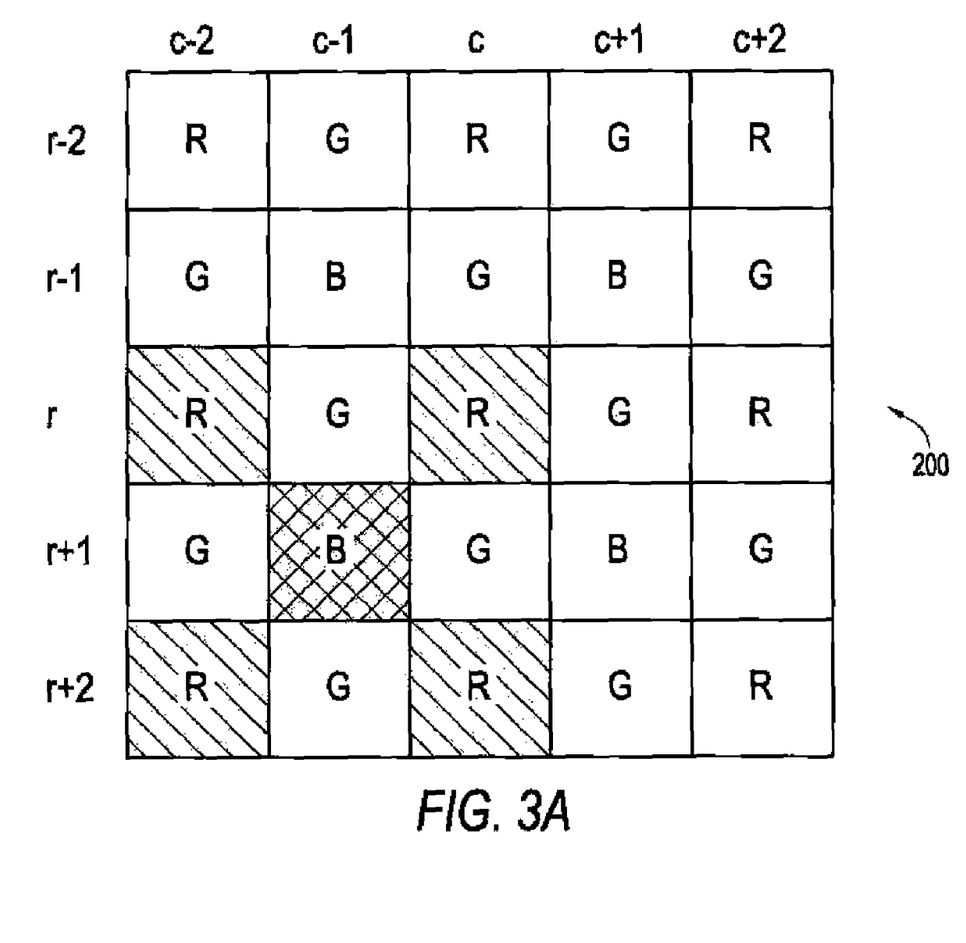
FIG. 3A illustrates a portion of a pixel array and the relative locations of pixels referenced in formulas (5) and (6).
Figure 3B:
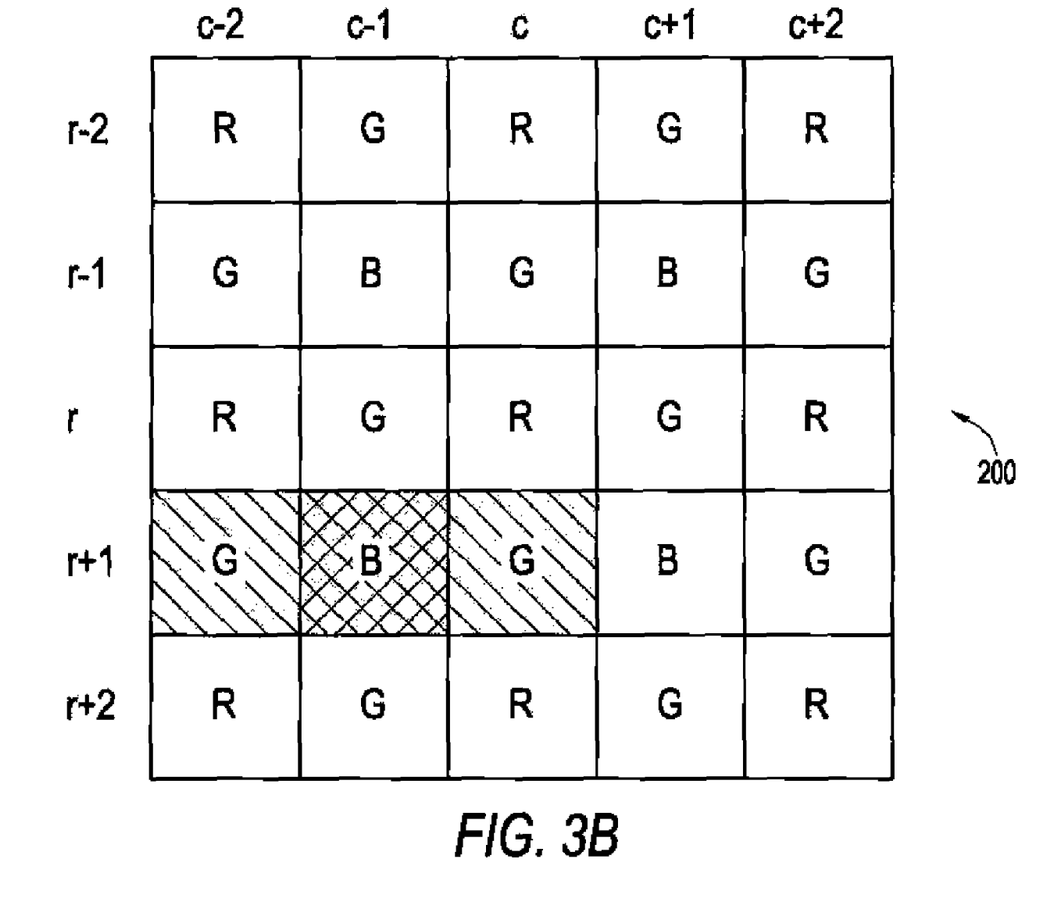
FIG. 3B illustrates a portion of a pixel array and the relative locations of pixels referenced in formulas (7) and (8).

When the subject pixel is a blue pixel (e.g., the pixel at row r+1 and column c−1 in FIG. 3A), $\bar{R}$, $\bar{G}_r$, $\bar{B}$, and $\bar{G}_b$ can be computed as follows:

$$\overline{R}_{(r+1,c-1)} = \frac{R_{(r+1,c-1)} + R_{(r,c-2)} + R_{(r,c)} + R_{(r+2,c-2)} + R_{(r+2,c)}}{5} \quad (5)$$

$$\overline{G}_{r_{(r+1,c-1)}} = \frac{G_{(r+1,c-1)} + G_{(r,c-2)} + G_{(r,c)} + G_{(r+2,c-2)} + G_{(r+2,c)}}{5} \quad (6)$$

$$\overline{B}_{(r+1,c-1)} = \frac{B_{(r+1,c-2)} + B_{(r+1,c-1)} + B_{(r+1,c)}}{3} \quad (7)$$

$$\overline{G}_{b_{(r+1,c-1)}} = \frac{G_{(r+1,c-2)} + G_{(r+1,c-1)} + G_{(r+1,c)}}{3} \quad (8)$$

FIG. 3A illustrates the relative locations of the pixels referenced in formulas (5) and (6). Similarly, FIG. 3B illustrates the relative locations of the pixels referenced in formulas (7) and (8).

Figure 4A:
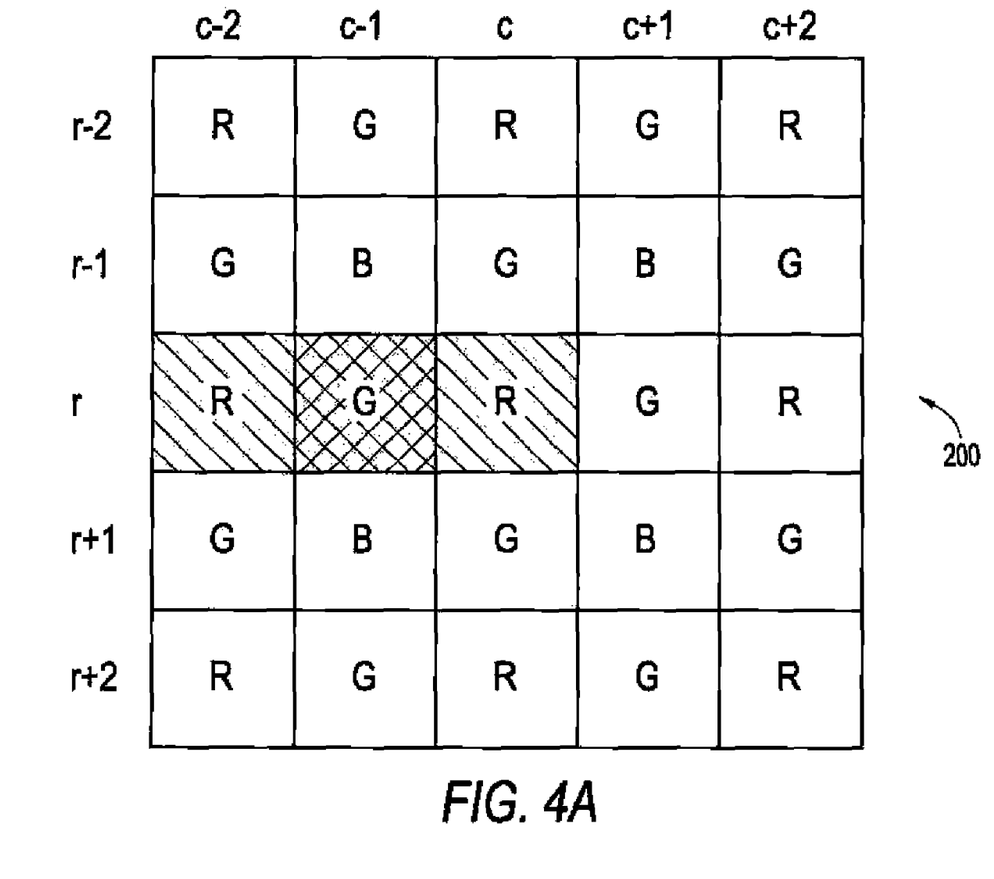
FIG. 4A illustrates a portion of a pixel array and the relative locations of pixels referenced in formulas (9) and (10).
Figure 4B:
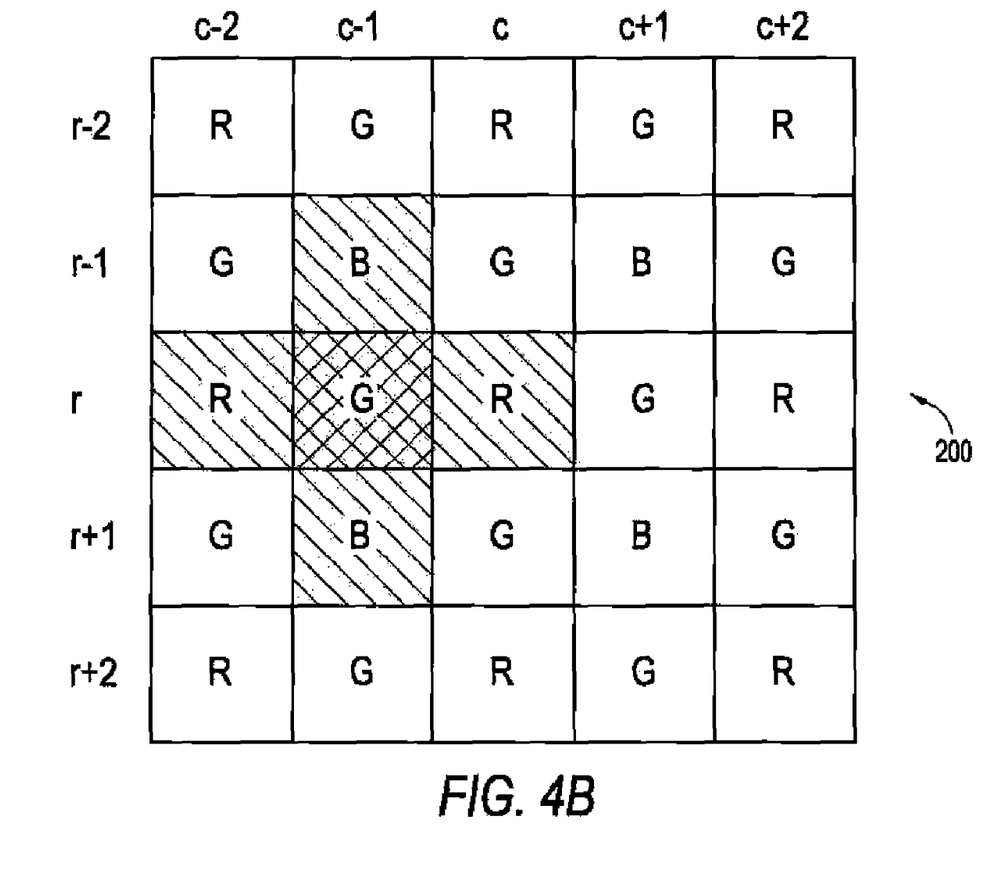
FIG. 4B illustrates a portion of a pixel array and the relative locations of pixels referenced in formulas (11) and (12).

When the subject pixel is a green pixel in a red/green row (e.g., the pixel at row r and column c−1 in FIG. 4A), $\overline{R}$, $\overline{G}_r$, $\overline{B}$, and $\overline{G}_b$ can be computed as follows:

$$\overline{R}_{(r,c-1)} = \frac{R_{(r,c-1)} + R_{(r,c-1)} + R_{(r,c)}}{3} \quad (9)$$

$$\overline{G}_{(r,c-1)} = \frac{G_{(r,c-1)} + G_{(r,c-1)} + G_{(r,c)}}{3} \quad (10)$$

$$\overline{B}_{(r,c-1)} = \frac{B_{(r,c-1)} + B_{(r-1,c-1)} + B_{(r+1,c-1)} + B_{(r,c-2)} + B_{(r,c)}}{5} \quad (11)$$

$$\overline{G}_{b_{(r,c-1)}} = \frac{G_{(r,c-1)} + G_{(r-1,c-1)} + G_{(r+1,c-1)} + G_{(r,c-2)} + G_{(r,c)}}{5} \quad (12)$$

FIG. 4A illustrates the relative locations of the pixels referenced in formulas (9) and (10). Similarly, FIG. 4B illustrates the relative locations of the pixels referenced in formulas (11) and (12).

Figure 5A:
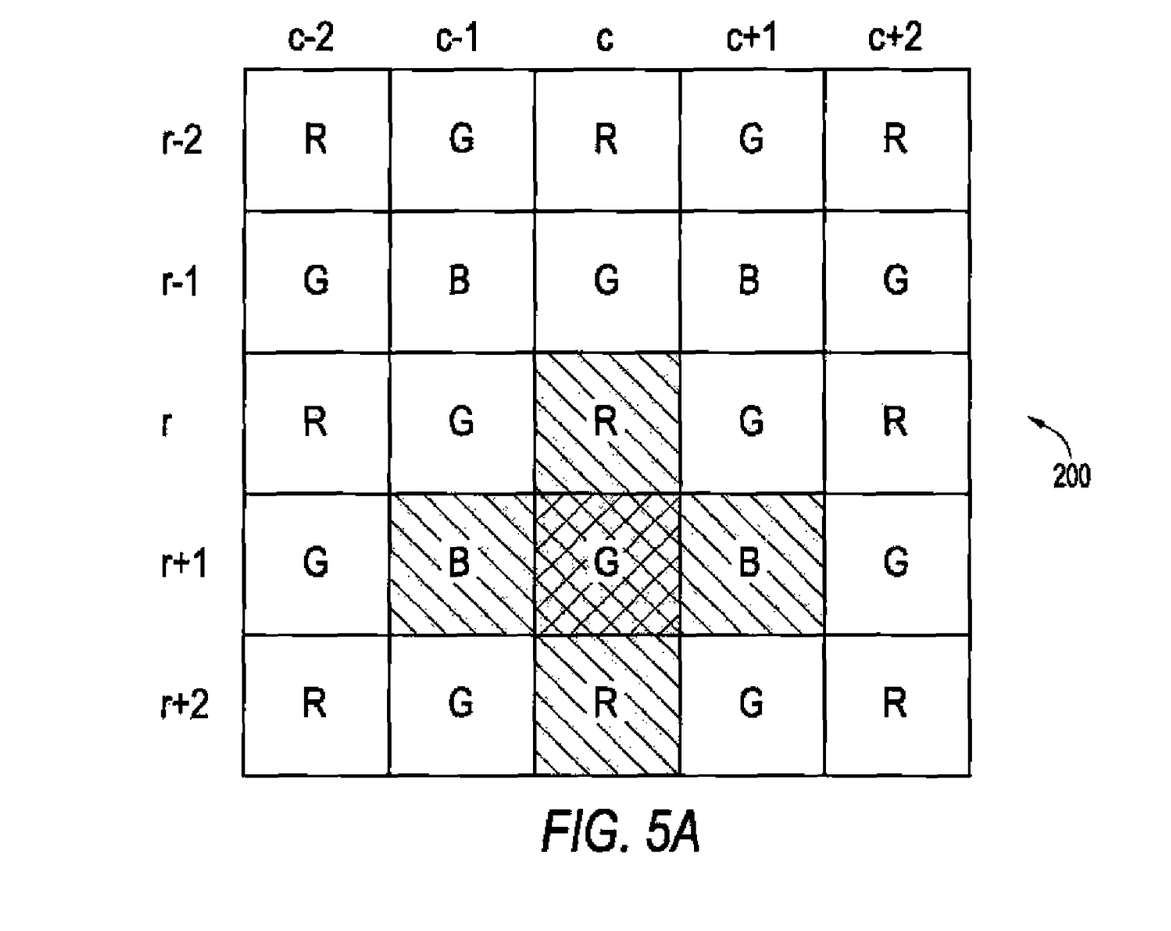
FIG. 5A illustrates a portion of a pixel array and the relative locations of pixels referenced in formulas (13) and (14).
Figure 5B:
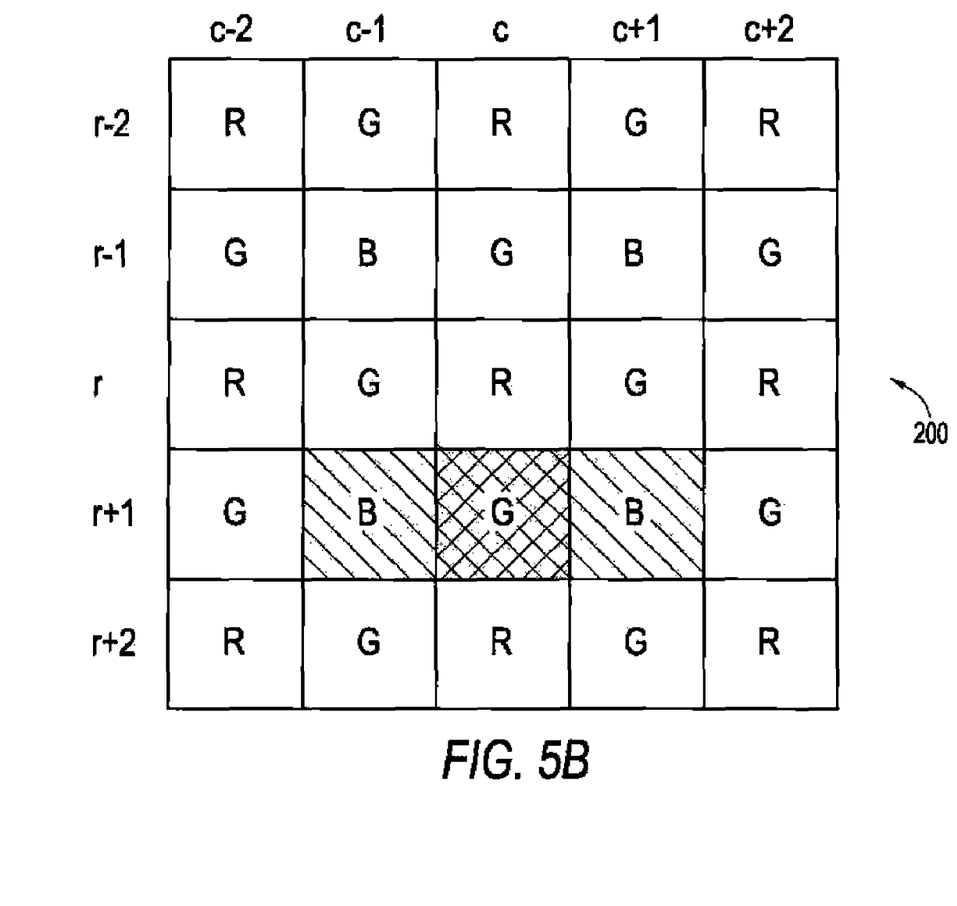
FIG. 5B illustrates a portion of a pixel array and the relative locations of pixels referenced in formulas (15) and (16).

When the subject pixel is a green pixel in a green/blue row (e.g., the pixel at row r+1 and column c in FIG. 5A), $\overline{R}$, $\overline{G}_r$, $\overline{B}$, and $\overline{G}_b$ can be computed as follows:

$$\overline{R}_{(r+1,c)} = \frac{R_{(r+1,c)} + R_{(r,c)} + R_{(r+2,c)} + R_{(r+1,c-1)} + R_{(r+1,c+1)}}{5} \quad (13)$$

$$\overline{G}_{r_{(r+1,c)}} = \frac{G_{(r+1,c)} + G_{(r,c)} + G_{(r+2,c)} + G_{(r+1,c-1)} + G_{(r+1,c+1)}}{5} \quad (14)$$

$$\overline{B}_{(r+1,c)} = \frac{B_{(r+1,c-1)} + B_{(r+2,c)} + B_{(r+1,c+1)}}{3} \quad (15)$$

$$\overline{G}_{b_{(r+1,c)}} = \frac{G_{(r+1,c-1)} + G_{(r+1,c)} + G_{(r+1,c+1)}}{3} \quad (16)$$

FIG. 5A illustrates the relative locations of the pixels referenced in formulas (13) and (14). Similarly, FIG. 5B illustrates the relative locations of the pixels referenced in formulas (15) and (16).

Referring back to FIG. 1, at step 107, the red, green, and blue pixel values of the subject pixel are converted to the $YC_bC_r$ domain. More specifically, the average values, $\overline{R}$, $\overline{G}_r$, $\overline{R}$, and $\overline{G}_r$ are used, in conjunction with red, green, and blue pixel values of the subject pixel, to compute luminance (Y), first chrominance ($C_b$), and second chrominance ($C_r$) values of the subject pixel. These are intermediate values used in subsequent computations, as described below. For all subject pixels, Y, $C_b$, and $C_r$ can be computed as follows:

$$Y = \frac{R_{(r,c)}}{4} + \frac{G_{(r,c)}}{2} + \frac{B_{(r,c)}}{4} \quad (17)$$

$$C_b = \overline{B} - \overline{G}_b \quad (18)$$

$$C_r = \overline{R} - \overline{G}_r \quad (19)$$

At step 108, the luminance (Y), first chrominance ($C_b$), and second chrominance ($C_r$) values computed at step 107 are used to compute a replacement red pixel value (R'), a replacement green pixel value (G'), and a replacement blue pixel value (B') of the subject pixel as follows:

$$R' = Y + \frac{3}{4}C_r - \frac{1}{4}C_b \quad (20)$$

$$G' = Y - \frac{1}{4}C_r - \frac{1}{4}C_b \quad (21)$$

$$B' = Y - \frac{1}{4}C_r + \frac{3}{4}C_b \quad (22)$$

According to formulas (20), (21), and (22) above, the luminance (Y) value contributes more to the replacement color pixel values than either the first chrominance ($C_b$) or second chrominance ($C_r$) values. By reducing the contribution of the chrominance values, color pixel value errors and, therefore, color artifacts can be reduced. In alternative embodiments, the standard formulas provided in ITU REC. 601 or REC. 709 can be used to convert pixel values between the Bayer and $YC_bC_r$ domains.

At step 109, the red, green, and blue pixel values of the subject pixel are replaced with the replacement red, green, and blue pixel values computed at step 108. This can be accomplished, for example, by overwriting pixel values of the subject pixel stored in a memory with the replacement pixel values.

At step 110, it is determined whether there are at least two more columns beyond column c in row r in the image captured at step 101 (i.e., whether there are at least two more pixels in the current row to be processed). If there are at least two more columns, the column counter is incremented at step 111 and the method continues at step 106 with the next pixel in the current row. If there are fewer than two more columns, the method continues at step 112. At step 112, it is determined whether there are at least two more rows beyond row r in the image captured at step 101. If there are at least two more rows, the row counter is incremented at step 113, row r+1 is loaded into memory at step 114, and the method continues at step 105 with a pixel in the next row. If there are fewer than two more rows, image processing to reduce color artifacts in accordance with a disclosed embodiment is complete. The replacement pixel values can then be used to form an output image with reduced color artifacts and, for example, displayed on a monitor, manipulated by software, or printed.

In the embodiments described above and illustrated in FIG. 1, demosaicing of all pixel data (step 102) occurs before color artifact reduction (steps 103-114). However, other sequences are possible. In another embodiment, color artifact reduction could be performed at substantially the same time as demosaicing. For example, once demosaicing of rows r−1, r, and r+1 is complete, row r could be reprocessed in accordance with a disclosed embodiment before demosaicing of row r+2. Indeed, performing demosaicing and color artifact reduction at substantially the same time may be advantageous if, for example, doing so reduces the number of times rows of pixel data must be read into a buffer memory and thereby reduces overall processing time.

The embodiments described above do not expressly process pixels on the edge of the image captured at step 101 because step 106 makes reference to pixel values that might not be available if the subject pixel is an edge pixel. Given the large number of pixels—typically at least thousands and often millions—in a digital image, failure to process edge pixels for color artifact reduction may be acceptable and have no significant affect on the aesthetic quality of the image. However, it should be understood that the disclosed embodiments can be modified to include processing of edge pixels. For example, references to unavailable pixels could be omitted from the formulas used at step 106 and the denominators of those formulas decreased to reflect the number of available pixel values.

Figure 6:
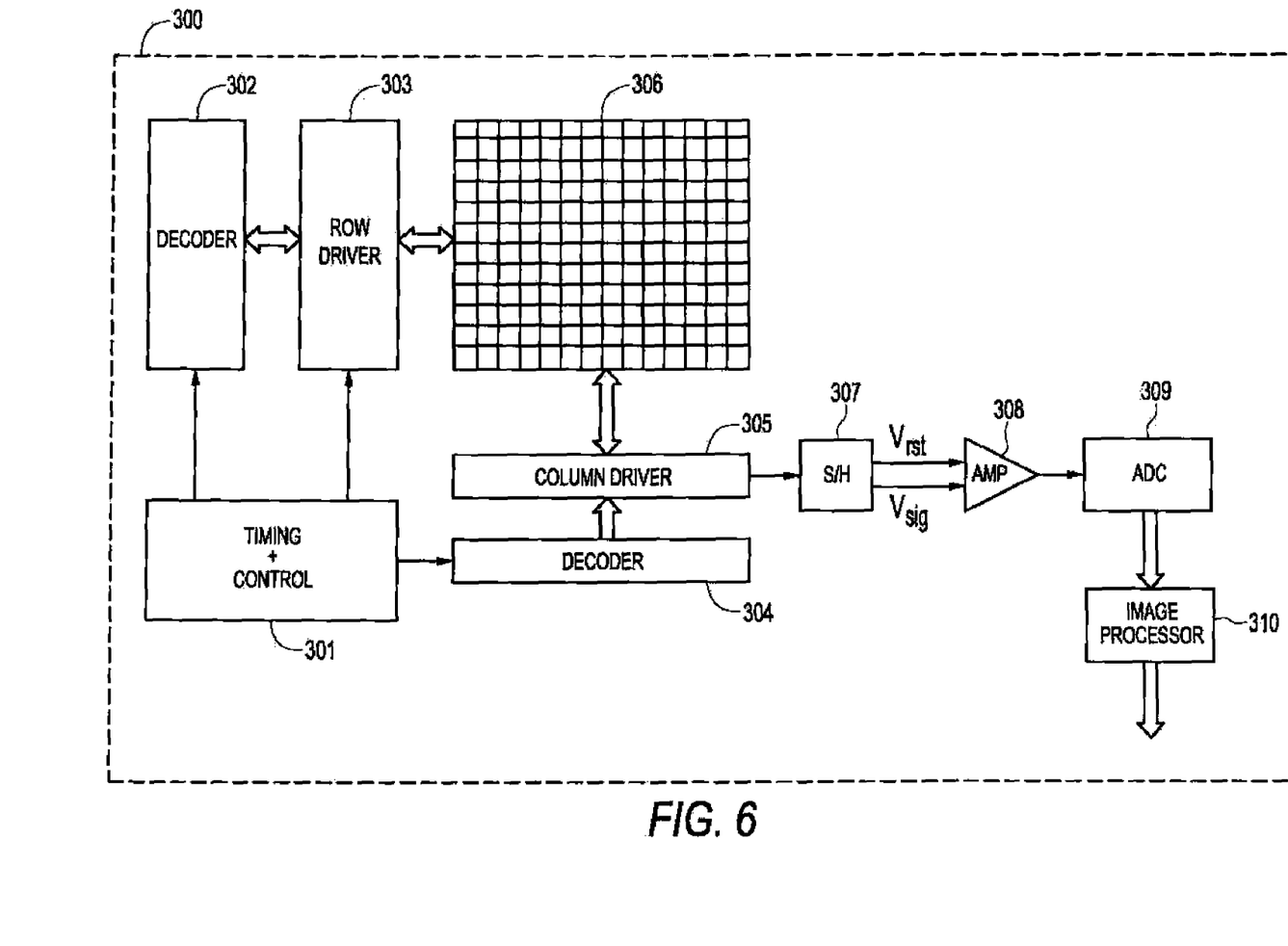
FIG. 6 is a partial top-down block diagram of an imager and associated readout circuitry constructed in accordance with a disclosed embodiment.

The following paragraphs describe how to implement embodiments of the disclosure in an imager and a processor system. FIG. 6 illustrates a partial top-down block diagram view of an imager 300 and associated read-out circuitry constructed in accordance with an embodiment disclosed herein. Although FIG. 6 illustrates a CMOS imager and associated read-out circuitry, embodiments may employ other types of imagers, for example a CCD imager.

When the imager 300 is operated to capture light, the pixel cells in each row of pixel array 306 are all turned on at the same time by a row select line, and the signals of the pixel cells of each column are selectively output onto output lines by respective column select lines. A plurality of row and column select lines are provided for the array 306. The row lines are selectively activated in sequence by a row driver 303 in response to a row address decoder 302 and the column select lines are selectively activated in sequence for each row activation by a column driver 305 in response to a column address decoder 304. Thus, row and column addresses are provided for each pixel cell of the pixel array 306. The imager 300 is operated by the timing and control circuit 301, which controls the address decoders 302, 304, which select the appropriate row and column select lines for pixel cell read-out, and the row and the column drivers 303, 305, which apply driving voltage to the drive transistors of the selected row and column lines.

In a CMOS imager, the pixel cell output signals typically include a pixel reset signal $V_{rst}$ taken off of a floating diffusion region when it is reset and a pixel image signal $V_{sig}$, which is taken off the floating diffusion region after charges generated by an image are transferred to it. The $V_{rst}$ and $V_{sig}$ signals for each pixel of pixel array 306 are read by a sample and hold circuit 307 and are subtracted by a differential amplifier 308 that produces a difference signal ($V_{rst}-V_{sig}$) for each pixel cell of pixel array 306, which represents the amount of light impinging on the pixel cell. This signal difference is digitized by an analog-to-digital converter (ADC) 309. The digitized pixel signals are then fed to an image processor 310 which processes the pixel signals and forms a digital image output. It is also possible to have separate driver and read-out circuits for each sub-array with the pixel output signal from the ADC 309 of each sub-array feeding into a common image processor circuit 310. As depicted in FIG. 6, the imager 300 is formed on a single semiconductor chip, although other configurations are possible, as known in the art.

Image processor circuit 310 may be constructed as a hardware circuit with associated memory, or as a programmed processor with associated memory, or as a combination of a hardware circuit and a programmed processor with associated memory. In one embodiment, the image processor circuit 310 is a pixel signal pipeline processing circuit configured to implement color artifact reduction in accordance with embodiments disclosed herein. Color artifact reduction is typically implemented late in the pixel processing pipeline, after demosaicing, because, as described above, artifact reduction algorithms typically operate on multi-channel color values (e.g., RGB or $YC_bC_r$) for each pixel, rather than raw pixel data received from the pixel away. Other configurations are possible, however. For example, color artifact reduction might be not be performed in the pixel processing pipeline at all but rather by a central processing unit (CPU) 404 connected to the imager 300 by a bus 403, as shown in FIG. 7, or by a standalone computer that receives an image from imager 300 via a communications medium (e.g., a portable memory device or a data communications network).

Figure 7:
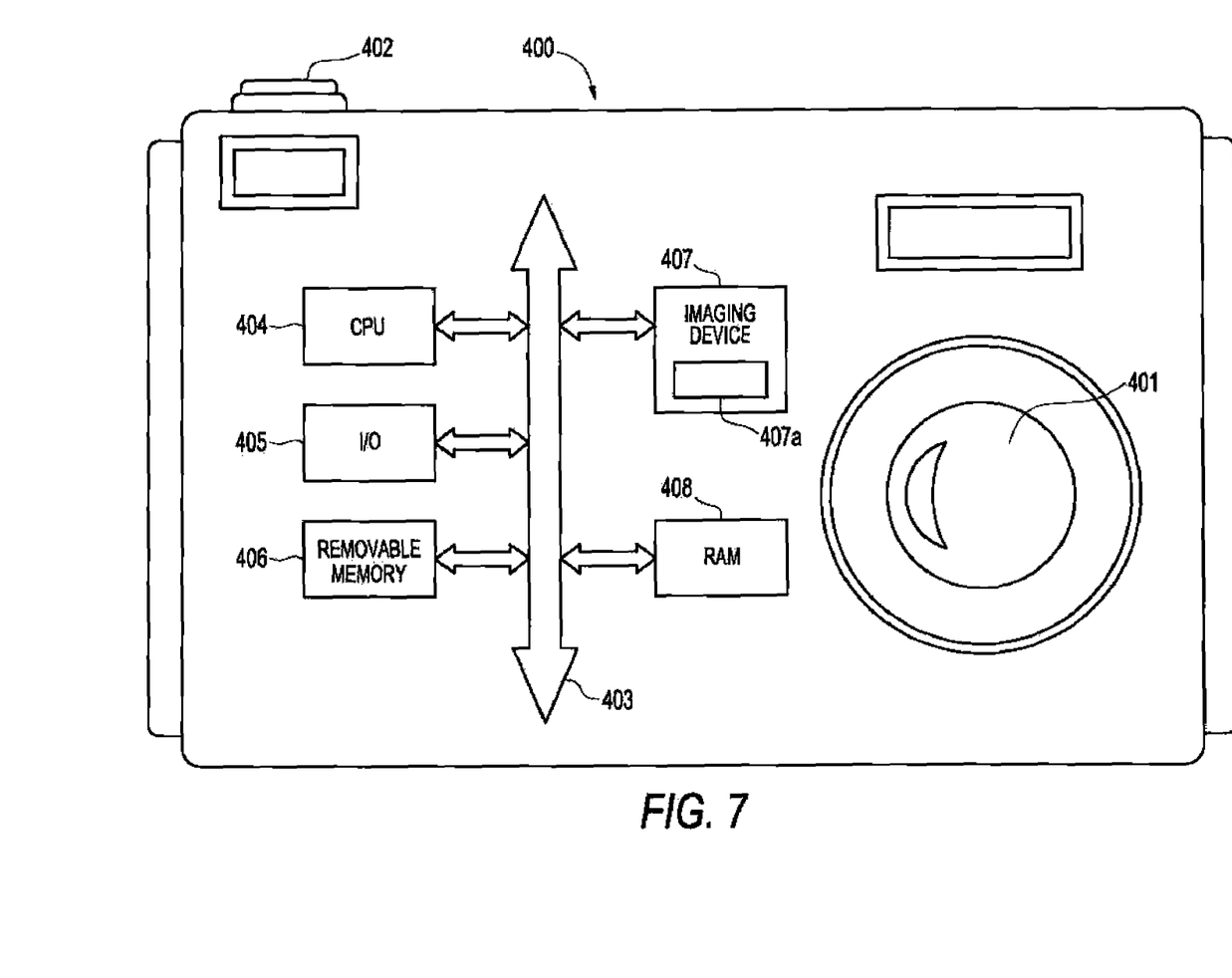
FIG. 7 illustrates a processor system constructed in accordance with a disclosed embodiment.

FIG. 7 shows a typical processor system 400, such as, for example, a digital camera. The system 400 includes a CPU 404 configured to implement color artifact reduction in accordance with embodiments disclosed herein. Without being limiting, such a system could also be a personal computer or workstation, camera, scanner, machine vision, vehicle navigation system, video phone, surveillance system, auto focus system, star tracker system, motion detection system, image stabilization system, or any other system able to implement false color artifact reduction in accordance with disclosed embodiments.

In one embodiment in which the system 400 is a digital camera, the system 400 includes a lens 401 for focusing an image on a pixel array 407a of an imaging device 407 when a shutter release button 402 is pressed. System 400 also comprises the CPU 404, such as a microprocessor that controls camera functions and image flow, and communicates with an input/output (I/O) device 405 over a bus 403. The CPU 404 might also be configured to perform color artifact reduction, although this could be accomplished by another processor or even a dedicated image processing chip (not shown). The imaging device 407 of device 400 also communicates with the CPU 404 over the bus 403. The processor system 400 also includes random access memory (RAM) 408, and can include removable memory 406, such as flash memory, which also communicates with the CPU 404 over the bus 403. The imaging device 407 may be combined with the CPU 404, with or without memory storage on a single integrated circuit or on a different chip than the CPU.

In another embodiment, the system 400 is a personal computer comprising a CPU 404, which communicates with an I/O device 405 and RAM 408 over a bus 403. In this embodiment, the system 400 does not necessarily include an imaging device 407. Rather, digital pixel values are transferred from another device, for example a digital camera, via any communications medium, for example by the I/O device 405. The digital pixel values may be in the form of a RAW image file generated by a digital camera or any other suitable image format, such as, for example, Tagged Image File Format (TIFF). The I/O device 405 might be, for example, a USB port, a memory card reader, a network port, a parallel port, a serial port, a FireWire port, a floppy disk drive, an optical disk drive, or a wireless transceiver. Once loaded in a memory, for example RAM 408 or possibly non-volatile storage such as a hard drive (not shown), the CPU 404 can perform false color artifact reduction in accordance with the embodiments disclosed herein. The resulting image might then be saved in a memory, for example removable memory 406 or RAM 408, output via an output device (not shown), for example a photo printer, posted on the Internet, or manipulated further by software such as, for example, Adobe® Photoshop®. Indeed, software such as Adobe® Photoshop® may be configured to implement the disclosed embodiments by, for example, a plug-in program module or by programming a filter or macro.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the claimed invention is not to be seen as limited by the foregoing description, but is only limited by the scope of the attached claims.

What is claimed as new and desired to be protected by Letters Patent of the United States is:

1. A method for reducing color artifacts in a digital image comprising a plurality of pixels with an image processor, the method comprising:
   with the image processor, averaging a plurality of demosaiced color pixel values of a subject pixel with respective demosaiced color pixel values of adjacent pixels to compute average color pixel values in a first color domain;
   with the image processor, converting the average color pixel values to a second color domain;
   with the image processor, determining replacement color pixel values in the first color domain based at least in part on the average color pixel values in the second color domain; and
   with the image processor, replacing the color pixel values of the subject pixel with the replacement color pixel values.

2. The method of claim 1, wherein the first color domain is a Bayer domain.

3. The method of claim 2, wherein the second color domain comprises luminance and chrominance channels.

4. The method of claim 3, wherein the second color domain is a $YC_bC_r$ domain, the $YC_bC_r$ domain comprising luminance (Y), first chrominance ($C_b$), and second chrominance ($C_r$) channels.

5. The method of claim 2, wherein the subject pixel is a red pixel and the averaging step comprises computing intermediate red and intermediate first green values with reference to demosaiced red and green pixel values of pixels in the same row as the subject pixel and in columns adjacent to the subject pixel, and computing intermediate blue and intermediate second green values with reference to demosaiced blue and green pixel values of pixels diagonally adjacent to the subject pixel.

6. The method of claim 2, wherein the subject pixel is a blue pixel and the averaging step comprises computing intermediate red and intermediate first green values with reference to demosaiced red and green pixel values of pixels diagonally adjacent to the subject pixel, and computing intermediate blue and intermediate second green values with reference to demosaiced blue and green pixel values of pixels in the same row as the subject pixel and in columns adjacent to the subject pixel.

7. The method of claim 2, wherein the subject pixel is a green pixel in a row of red and green pixels and the averaging step comprises computing intermediate red and intermediate first green values with reference to demosaiced red and green pixel values of pixels in the same row as the subject pixel and in columns adjacent to the subject pixel, and computing intermediate blue and intermediate second green values with reference to demosaiced blue and green pixel values of pixels diagonally adjacent to the subject pixel.

8. The method of claim 2, wherein the subject pixel is a green pixel in a row of green and blue pixels and the averaging step comprises computing intermediate red and intermediate first green values with reference to demosaiced red and green pixel values of pixels diagonally adjacent to the subject pixel, and computing intermediate blue and intermediate second green values with reference to demosaiced blue and green pixel values of pixels in the same row as the subject pixel and in columns adjacent to the subject pixel.

9. The method of claim 2, wherein the averaging step comprising averaging red, green, and blue pixel values of the subject pixel with, respectively, red, green, and blue pixel values of pixels in the same row as the subject pixel and in columns adjacent to the subject pixel.

10. The method of claim 2, wherein the averaging step comprising averaging red, green, and blue pixel values of the subject pixel with, respectively, red, green, and blue pixel values of pixels diagonally adjacent to the subject pixel.

11. The method of claim 1, further comprising repeating the averaging, converting, determining, and replacing steps for substantially all pixels in the image.

12. The method of claim 11, further comprising outputting an image comprising the replacement pixel values associated with each pixel.

13. A method for reducing color artifacts in a Bayer domain demosaiced image with an image processor, the method comprising:
   with the image processor, combining original red, green, and blue pixel values of a subject demosaiced pixel with red, green, and blue pixel values, respectively, of neighboring demosaiced pixels to determine intermediate red, first green, second green, and blue pixel values;
   with the image processor, converting the intermediate red, first green, second green, and blue pixel values to a $YC_bC_r$ domain to yield luminance (Y), first chrominance ($C_b$), and second chrominance ($C_r$) pixel values;
   with the image processor, determining replacement red, green, and blue pixel values based at least in part on the Y, $C_b$, and $C_r$ pixel values; and
   with the image processor, substituting the replacement red, green, and blue pixel values for the original red, green, and blue pixel values of the subject pixel.

14. The method of claim 13, wherein the subject demosaiced pixel is a red pixel located at row r and column c of the image and the combining step comprises computing intermediate red, first green, blue, and second green pixel values as follows:

$$\overline{R}_{(r,c)} = \frac{R_{(r,c-1)} + R_{(r,c)} + R_{(r,c+1)}}{3}$$

$$\overline{G}_{r_{(r,c)}} = \frac{G_{(r,c-1)} + G_{(r,c)} + G_{(r,c+1)}}{3}$$

$$\overline{B}_{(r,c)} = \frac{B_{(r,c)} + B_{(r-1,c-1)} + B_{(r-1,c+1)} + B_{(r+1,c-1)} + B_{(r+1,c+1)}}{5}$$

$$\overline{G}_{b_{(r,c)}} = \frac{G_{(r,c)} + G_{(r-1,c-1)} + G_{(r-1,c+1)} + G_{(r+1,c-1)} + G_{(r+1,c+1)}}{5}$$

wherein $\overline{R}_{(r,c)}$ is the intermediate red pixel value, $\overline{G}_{r_{(r,c)}}$ is the intermediate first green pixel value, $\overline{B}_{(r,c)}$ is the intermediate blue pixel value, and $\overline{G}_{b_{(r,c)}}$ is the intermediate second green pixel value, R is the original red pixel value of the pixel at the row and column indicated in the associated subscript, G is the original green pixel value of the pixel at the row and column indicated in the associated subscript, and B is the original blue pixel value of the pixel at the row and column indicated in the subscript.

15. The method of claim 13, wherein the subject demosaiced pixel is a blue pixel located at row r+1 and column c−1 of the image and the combining step comprises computing intermediate red, first green, blue, and second green pixel values as follows:

$$\overline{R}_{(r+1,c-1)} = \frac{R_{(r+1,c-1)} + R_{(r,c-2)} + R_{(r,c)} + R_{(r+2,c-2)} + R_{(r+1,c)}}{5}$$

$$\overline{G}_{r_{(r+1,c-1)}} = \frac{G_{(r+1,c-1)} + G_{(r,c-2)} + G_{(r,c)} + G_{(r+2,c-2)} + G_{(r+2,c)}}{5}$$

$$\overline{B}_{(r+1,c-1)} = \frac{B_{(r+1,c-2)} + B_{(r+1,c-1)} + B_{(r+1,c)}}{3}$$

$$\overline{G}_{b_{(r+1,c-1)}} = \frac{G_{(r+1,c-2)} + G_{(r+1,c-1)} + G_{(r+1,c)}}{3}$$

wherein $\overline{R}_{(r+1,c-1)}$ is the intermediate red pixel value, $\overline{G}_{r_{(r+1,c-1)}}$ the intermediate first green pixel value; $\overline{B}_{(r+1,c-1)}$ is the intermediate blue pixel value, and $\overline{G}_{b_{(r+1,c-1)}}$ the intermediate second green pixel value, R is the original red pixel value of the pixel at the row and column indicated in the associated subscript, G is the original green pixel value of the pixel at the row and column indicated in the associated subscript, and B is the original blue pixel value of the pixel at the row and column indicated in the subscript.

16. The method of claim 13, wherein the subject demosaiced pixel is a green pixel in a row of red and green pixels located at row r and column c−1 of the image and the combining step comprises computing intermediate red, first green, blue, and second green pixel values as follows:

$$\overline{R}_{(r,c-1)} = \frac{R_{(r,c-2)} + R_{(r,c-1)} + R_{(r,c)}}{3}$$

$$\overline{G}_{(r,c-1)} = \frac{G_{(r,c-2)} + G_{(r,c-1)} + G_{(r,c)}}{3}$$

$$\overline{B}_{(r,c-1)} = \frac{B_{(r,c-1)} + B_{(r-1,c-1)} + B_{(r+1,c-1)} + B_{(r,c-2)} + B_{(r,c)}}{5}$$

$$\overline{G}_{b_{(r,c-1)}} = \frac{G_{(r,c-1)} + G_{(r-1,c-1)} + G_{(r+1,c-1)} + G_{(r,c-2)} + G_{(r,c)}}{5}$$

wherein $\overline{R}_{(r,c-1)}$ is the intermediate red pixel value, $\overline{G}_{r_{(r,c-1)}}$ is the intermediate first green pixel value, $\overline{B}_{(r,c-1)}$ is the intermediate blue pixel value, and $\overline{G}_{b_{(r,c-1)}}$ is the intermediate second green pixel value, R is the original red pixel value of the pixel at the row and column indicated in the associated subscript, G is the original green pixel value of the pixel at the row and column indicated in the associated subscript, and B is the original blue pixel value of the pixel at the row and column indicated in the subscript.

17. The method of claim 13, wherein the subject demosaiced pixel is a green pixel in a row of green and blue pixels located at row r+1 and column c of the image and the combining step comprises computing intermediate red, first green, blue, and second green pixel values as follows:

$$\overline{R}_{(r+1,c)} = \frac{R_{(r+1,c)} + R_{(r,c)} + R_{(r+2,c)} + R_{(r+1,c-1)} + R_{(r+1,c+1)}}{5}$$

$$\overline{G}_{r_{(r+1,c)}} = \frac{G_{(r+1,c)} + G_{(r,c)} + G_{(r+2,c)} + G_{(r+1,c-1)} + G_{(r+1,c+1)}}{5}$$

$$\overline{B}_{(r+1,c)} = \frac{B_{(r+1,c-1)} + B_{(r+1,c)} + B_{(r+1,c+1)}}{3}$$

$$\overline{G}_{b_{(r+1,c)}} = \frac{G_{(r+1,c-1)} + G_{(r+1,c)} + G_{(r+1,c+1)}}{3}$$

wherein $\overline{R}_{(r+1,c)}$ is the intermediate red pixel value, $\overline{G}_{r_{(r+1,c)}}$ is the intermediate first green pixel value, $\overline{B}_{(r+1,c)}$ is the intermediate blue pixel value, and $\overline{G}_{b_{(r+1,c)}}$ is the intermediate second green pixel value, R is the original red pixel value of the pixel at the row and column indicated in the associated subscript, G is the original green pixel value of the pixel at the row and column indicated in the associated subscript, and B is the original blue pixel value of the pixel at the row and column indicated in the subscript.

18. The method of claim 13, wherein the converting to the $YC_bC_r$ domain step comprises computing luminance (Y), first chrominance ($C_b$), and second chrominance ($C_r$) pixel values as follows:

$$Y = \frac{R_{(r,c)}}{4} + \frac{G_{(r,c)}}{2} + \frac{B_{(r,c)}}{4}$$

$$C_b = \overline{B} - \overline{G}_b$$

$$C_r = \overline{R} - \overline{G}_r$$

wherein the subject demosaiced pixel is located at row r and column c of the image, $R_{(r,c)}$ is the original red pixel value of the subject demosaiced pixel, $G_{(r,c)}$ is the original green pixel value of the subject demosaiced pixel, $B_{(r,c)}$ is the original blue pixel value of the subject demosaiced pixel, $\overline{R}$ is the average red pixel value, $\overline{G}_b$ is the average first green pixel value, $\overline{G}_r$ is the average second green pixel value, and $\overline{B}$ is the average blue pixel value.

19. The method of claim 18, wherein the determining step comprises computing replacement red, green, and blue pixel values as follows:

$$R' = Y + \frac{3}{4}C_r - \frac{1}{4}C_b$$

$$G' = Y - \frac{1}{4}C_r - \frac{1}{4}C_b$$

$$B' = Y - \frac{1}{4}C_r + \frac{3}{4}C_b$$

wherein R' is the replacement red pixel value, G' is the replacement green pixel value, and B' is the replacement blue pixel value.

20. An imager configured to reduce color artifacts in a digital image, the imager comprising:
   a pixel array configured to generate pixel signal values in response to incident light;
   a memory coupled to the pixel array and configured to store digital pixel values corresponding to the pixel signal values; and
   a processor coupled to the pixel array and configured to:
      demosaic the digital pixel values to generate a plurality of demosaiced color pixel values associated with each pixel of the pixel array;
      average the demosaiced color pixel values of a subject pixel with respective demosaiced color pixel values of adjacent pixels to compute average color pixel values in a first color domain;

convert the average color pixel values to a second color domain;

determine replacement color pixel values in the first color domain based at least in part on the average color pixel values in the second color domain; and replace the color pixel values of the subject pixel with the replacement color pixel values.

21. The imager of claim 20, wherein the first color domain is a Bayer domain and the second color domain is a $YC_bC_r$ domain.

22. The imager of claim 20, wherein the memory is a three-line buffer memory configured to store the row of pixel data containing the subject pixel, the immediately previous row, and the immediately subsequent row.

23. A system configured to reduce color artifacts in a digital image, the system comprising:

an input device configured to receive pixel values;

a processor coupled to the input device and configured to:

average demosaiced color pixel values of a subject pixel with respective demosaiced color pixel values of adjacent pixels to compute average color pixel values in a first color domain;

convert the average color pixel values to a second color domain;

determine replacement color pixel values in the first color domain based at least in part on the average color pixel values in the second color domain; and replace the color pixel values of the subject pixel with the replacement color pixel values, and an output device configured to output an image comprising the replacement color pixel values.

24. The system of claim 23, wherein the first color domain is a Bayer domain and the second color domain is a $YC_bC_r$ domain.

25. The imager of claim 23, wherein the processor is further configured to repeat the averaging, converting, determining, and replacing steps for substantially all pixels in the image.

* * * * *